United States Patent [19]

Chen et al.

[11] Patent Number: 5,796,833
[45] Date of Patent: Aug. 18, 1998

[54] PUBLIC KEY STERILIZATION

[75] Inventors: Lidong Chen, Sunnyvale; Charles S. Williams, Cupertino, both of Calif.

[73] Assignee: Cylink Corporation, Sunnyvale, Calif.

[21] Appl. No.: 718,755

[22] Filed: Sep. 23, 1996

[51] Int. Cl.[6] .................................. H04L 9/00; H04L 9/30
[52] U.S. Cl. .......................... 380/25; 380/21; 380/23; 380/30; 380/44; 380/49
[58] Field of Search ............................ 380/4, 9, 21, 23, 380/25, 30, 44, 45, 46, 47, 49, 50, 59

[56] References Cited

U.S. PATENT DOCUMENTS

| | | | |
|---|---|---|---|
| 4,225,935 | 9/1980 | Zscheile, Jr. et al. | |
| 4,351,982 | 9/1982 | Miller et al. | |
| 4,514,592 | 4/1985 | Miyaguchi | |
| 4,658,094 | 4/1987 | Clark | 380/28 |
| 4,748,668 | 5/1988 | Shamir et al. | 380/30 |
| 4,759,063 | 7/1988 | Chaum | 380/30 |
| 4,759,064 | 7/1988 | Chaum | 380/30 |
| 4,876,716 | 10/1989 | Okamoto | 380/21 |
| 4,995,082 | 2/1991 | Schnorr | 380/23 |
| 5,164,988 | 11/1992 | Matyas et al. | 380/25 |
| 5,420,927 | 5/1995 | Micali | 380/23 |
| 5,604,804 | 2/1997 | Micali | 380/25 |

OTHER PUBLICATIONS

Rivest, Ronald L. et al., "A Method For Obtaining Digital Signatures and Public Key Crytosystems", Massachusetts Institute of Technology, Laboratory For Computer Science, Apr. 1977, pp. 1-10.

Rivest, Ronald L. et al., "On Digital Signatures and Public-Key Cryptosystems", Massachusetts Institute of Technology, Laboratory For Computer Science, Apr. 1977, pp. 1-10.

Primary Examiner—Bernarr E. Gregory
Attorney, Agent, or Firm—David Newman Chartered

[57] ABSTRACT

A public key sterilization scheme for thwarting possible attacks based on choosing malicious public keys. A first user sends public key information to a certificate authority. The certificate authority manipulates the public key information, and sends certified version of the public key information to the first user. The first user verifies the certified key, and calculates a second private key.

14 Claims, 3 Drawing Sheets

5,796,833

PUBLIC KEY STERILIZATION

BACKGROUND OF THE INVENTION

This invention relates to certification of public keys as used for encrypting and authenticating data, and more particularly to a method and apparatus for public key sterilization by a certificate authority.

DESCRIPTION OF THE RELEVANT ART

Awareness of the value of information together with advances in modern state-of-the-art telecommunications technologies including personal computers, local area networks, distributed data bases, packet radio, satellite teleconferencing, electronic mail, and electronic funds transfer, has stimulated and increased awareness of the vulnerability of communications links to interception and of the susceptibility of databases to exploitation and tampering. This same telecommunications revolution has made the wide spread availability of technology for implementing techniques which can provide authenticated communications that also can be made secure against eavesdropping or tampering.

Primary users of a secure network of communicators include the banking community which has a need for ensuring that funds, electronically transferred, are sent correctly: a message authentication problem. Similarly, the stocks and securities community, which operates on a computer network, has a requirement that the buying and selling of stocks are authentically sent to and from the correct person.

As public key cryptography techniques are widely employed, a large number of users must certify their public keys with one or more certificate authorities (CAs). By necessity, users trust the certificate authority, but users do not necessarily trust one another. Since proposals for certificate authorities allow the users to unilaterally select their private key and public key, a malicious user possibly may generate keys that can be used to plot against other users.

A malicious user can generate a key that is a function of another user's key such that the key establishment protocol can be spoofed, as disclosed in A. J. Menezes, M. Qu and S. Vanstone, "Some New Key Agreement Protocols Providing Implicit Authentication", presented at Selected Area of Cryptography conference, May 1995, pp. 1–13. The replacement of a public key may be purposed in misrepresenting an encrypted message. See, R. Anderson and R. Needham, "Robustness Principles for Public Key Protocols", Advances in Cryptology—Crypto '95, Lecture Notes in Computer Science, Springer, 1995, pp. 236–247. Certificate authority cannot play its role in making a digital signature a legal commitment, if users were allowed to change their public keys at will.

These attacks have been noticed by cryptographers, A. J. Menezes, M. Qu and S. Vanstone, "Some New Key Agreement Protocols Providing Implicit Authentication", presented at Selected Area of Cryptography conference, May 1995, pp. 1–13, and R. Anderson and R. Needham, "Robustness Principles for Public Key Protocols", Advances in Cryptology—Crypto '95, Lecture Notes in Computer Science, Springer, 1995, pp. 236–247. Most solutions to these kind of attacks, however, are based on the protocol design.

For example, in order to prevent an attacker from spoofing a key establishment protocol by a malicious public key, the session key is applied to a hash function and transmitted. This is not a secure way, however, to send the key. A. J. Menezes, M. Qu and S. Vanstone, "Some New Key Agreement Protocols Providing Implicit Authentication", presented at Selected Area of Cryptography conference, May 1995, pp. 1–13.

In order to prevent misinterpreting a signature, people specified that a message first is signed and then encrypted, if both signature and encryption actions were applied to it. R. Anderson and R. Needham, "Robustness Principles for Public Key Protocols", Advances in Cryptology—Crypto '95, Lecture Notes in Computer Science, Springer, 1995, pp. 236–247. This requirement or specification may bring some inconvenience.

SUMMARY OF THE INVENTION

A general object of the invention is a practical and efficient method for certifying public keys.

Another object of the invention is a method for certifying public keys that does not add a burden to an encryption algorithm.

According to the present invention, as embodied and broadly described herein, a method for sterilizing a first public key by a certificate authority using a certificate authority (CA) processor. A user, using a user's processor, generates a first public key. The first public key may be generated from a first private key, which is known to the user. If the first public key is generated from a first private key using a first function, the first function is easy for a user to compute the first public key from the first private key, and difficult for other users to compute private key from the first public key. By "easy" and "difficult" is meant that the difficult computation requires many orders of magnitude more computer cycles than the easy computation. The method comprises the steps of sending, from the user to the certificate authority, the first public key; and generating, at the certificate authority with the CA processor, a first random factor. A second random factor, third random factor, or more random factors, may be generated at the certificate authority using the CA processor. The steps include calculating, at the certificate authority with the CA processor, a second public key using a second function, from the first public key, and the random factors. The second function is easy for computing the second public key from the first public key and random factors, and difficult for computing the random factors given the first and second public keys. Additional random factors may be generated randomly and used in calculating the second public key. The method certifies the second public key, and does so by generating a certificate of sterilization of the second public key.

The method further includes the step of sending, from the certificate authority to the user, the first random factor, and additional random factors, if generated, and the certificate of second public key. The method includes the steps of verifying, at the user using the user processor, the certification of second public key, and calculating, at the user using the user processor, a second private key, from the first random factor, and additional random factors, and the first private key, or from the second public key and some user's private information.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
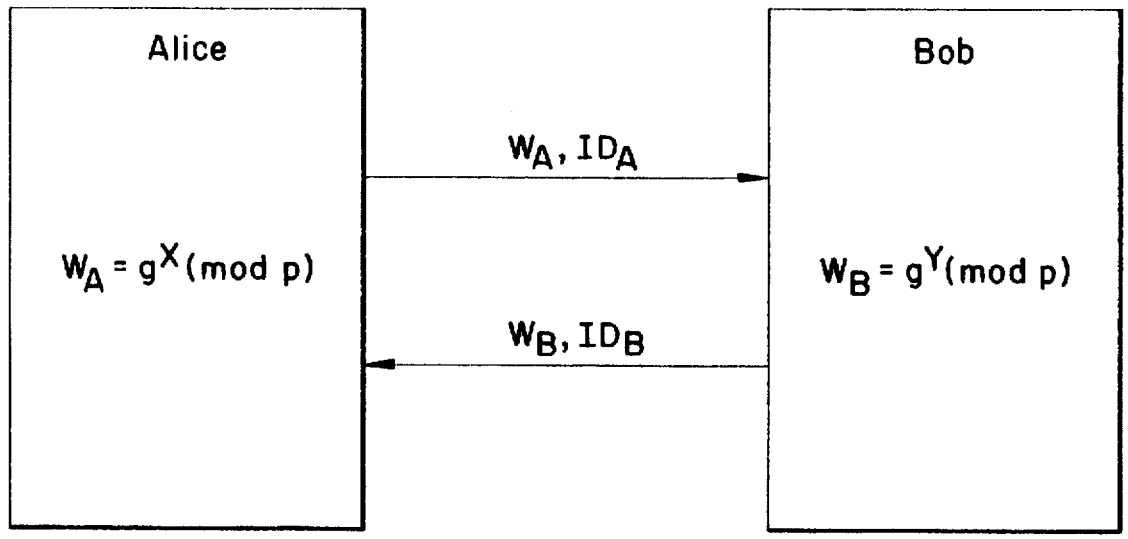
FIG. 1 illustrates generation of a session key.

Reference now is made in detail to the present preferred embodiments of the invention, examples of which are illustrated in the accompanying drawings, wherein like numerals indicate like elements throughout the several views.

The invention disclosed herein provides a new and novel method for sterilizing public keys by a certificate authority. The term "certificate authority" is used herein to indicate one or more, certificate authorities. There may be multiple certificate authorities, but this disclosure refers to a certificate authority as a generic authority for certifying a key.

The method for sterilizing public keys is general for dealing with different possible attacks. The invention is practical and efficient in the sense that the invention is a scheme for certifying the keys. The invention does not add a burden to cryptographic algorithms.

As the name implies, the sterilization scheme disclosed herein produces a cryptographically "clean" key from a potentially "dirty" key. The basic idea is that the certificate authority does not directly certify public keys offered by the user. Rather, the certificate authority certifies a randomly perturbed version of a public key, which becomes the second public key or the sterilized public key, and passes information to the user so that the user can perturb his corresponding private key. The sterilization does not reduce the secrecy of the private key in the sense that the entropy of the private key after being perturbed is identical to the entropy before being perturbed.

This discussion discloses three examples of how attackers can achieve their purposes by choosing malicious public keys. A Digital Signature Standard (DSS) public key, Diffie-Hellman static public numbers, and ElGamal public encryption key, and an RSA public key sterilization scheme is described. The soundness and security of the schemes also are discussed.

Public Key Cryptographic Concepts

Public key cryptographic systems are based on the one-way function and the one-way trapdoor function.

Consider first, the concept of a one-way function. A one-way function is a function such that the function value is easy to compute but the inverse of the function is difficult to compute. That is, if $Y=f(X)$, then for a given X, it is easy to compute Y. But given Y, it is difficult to find a X such that $X=f^{-1}(Y)$.

Different from a one-way function, a one-way trapdoor function involves some trapdoor information. If a function $Y=f(X)$ is a one-way trapdoor function, then Y is easy to compute for any given X. But without knowing trapdoor information, given a Y, it is difficult to use the inverse function to compute X such that $X=f^{-1}(Y)$. By "it is difficult", we mean it is computationally infeasible.

Public key cryptography has three main applications: key establishment, encryption, and digital signature.

Key Establishment

By conventional, symmetric, cryptographic technology, in order to send encrypted message on an insecure channel, the key is sent on a secure channel. For example, if the data were encrypted by Data Encryption Standard (DES), then the key used by the transmitter to encrypt the data is transferred securely to the receiver. Public key cryptography solved this problem by Diffie-Hellman key exchange scheme.

By Diffie-Hellman key exchange scheme, the two parties can establish a common secret key by exchanging public messages.

Diffie-Hellman key exchange is based on the observation that the exponentiation function in a Galois field GF(p) is a one-way function, where p is a large prime. GF(p) can be represented as a integer set $\{0, 1, 2, \ldots, p-1\}$. There is no distinction between GF(p) and the integer set in the following discussion. If g were a number in GF(p) with property that p−1 or a larger prime factor of p−1 were the smallest number n satisfying $g^n=1 \pmod p$, then for a given Y, it is difficult to find a X such that $g^x=Y \pmod p$.

For a terminal A and a terminal B to generate a shared secret key, terminal A randomly generates a private number $X_A$ in $\{2, 3, \ldots, p-2\}$, call this terminal A's private number, and computes a corresponding public number $Y_A=g^{X_A} \pmod p$, called terminal A's public number.

Terminal B also randomly generates a private number $X_B$ in $\{2, 3, \ldots, p-2\}$, defined as terminal B's private number, and computes a corresponding public number, $Y_B=g^{X_B} \pmod p$, defined as terminal B's public number.

Terminal A and terminal B can share a secret number that is unique to them by exchanging only public numbers. Specifically, suppose terminal A sends its public number, $Y_A$, to terminal B while terminal B sends its public number, $Y_B$, to terminal A. Since for any a and b, $g^{ab} \pmod p = g^{ba} \pmod p$, terminal A can compute $$Z=Y_B^{X_A} \pmod p$$

while terminal B can compute the same number by $$Z=Y_A^{X_B} \pmod p.$$

This shared secret number, Z, is shared by terminal A and terminal B. The shared number, Z, can be used as a DES key to encrypt data transferred between terminal A and terminal B.

A terminal may have more than one pair of public/private numbers. Some public numbers may have long lives and could be therefore certified by certificate authority. Other public numbers might be generated on-line and used for short periods of time. A common shared secret number, Z, can be produced by terminal A by using terminal A's private numbers and terminal B's public numbers. Similarly, the common shared secret number can be produced by terminal B by using terminal B's private numbers and terminal A's public numbers.

Encryption

A public key encryption scheme can be used to encrypt data. Each user has at least a pair of keys. One key is called public key, pk, and another key is called private key, sk. The public key pk can be certified by the certificate authority. A certificate of a public key binds the public key and the user's personal identity together. For any user, the public key or keys are either available from a publicly accessible list or from the user directly. The private key sk remains as the user's private information. The private key is computationally difficult to compute from a given public key.

Terminal B can send encrypted data to terminal A by first passing the data and terminal A's public key, $pk_A$, through an encryption algorithm. Terminal A can decrypt the data by passing the data and terminal A's private key through a decryption algorithm. Therefore, information encrypted by a public key can be decrypted by a corresponding private key.

ElGamal public key encryption scheme is based on the observation that the exponentiation function in a finite field GF(p) is a one-way function, if p is a large prime.

Terminal A generates a private key $X_A$ in $\{2, 3, \ldots, p-2\}$. Terminal A computes public key $pk_A=Y_A=g^{X_A}(\bmod\ p)$, where the generator value, g, is a number in $\{1, 2, \ldots, p-1\}$ satisfying that the smallest number n satisfying $g^n=1(\bmod\ p)$ is p−1. The public number, $pk_A$, is typically certified by certificate authority. The generator value, g, is publicly known information.

Suppose terminal B wants to send an encrypted message M to terminal A. M is represented as a number in GF(p). Terminal B gets $pk_A$ from either a publicly accessible database or directly from terminal A. Terminal B verifies that $pk_A$ is indeed terminal A's public key. Terminal B generates a random number r in $\{2, 3, \ldots, p-2\}$ and computes $R=g^r(\bmod\ p)$. Finally terminal B computes $C=Y_A^r M(\bmod\ p)$. The encryption of message M is (R, C).

When terminal A receives the encrypted message (R, C), terminal A computes $M=CR^{-X_A}(\bmod\ p)$, which is decryption of (R, C).

A different public-key algorithm is the RSA public key encryption technique, which was invented by Rivest, Shamir, and Adleman. RSA encryption scheme is based on the observation that function $F_e(M)=M^e(\bmod\ n)$ is a one-way trapdoor function, when n is a product of two large primes p and q.

The strength of RSA is based on the observation that factoring a product of two large prime numbers is difficult. The prime numbers, (p, q), are the trapdoor information.

By knowing e and p and q, the inverse of $F_e(M)$ can be computed. In fact, if p and q were known, then the inverse can be computed by $$de=1\ \bmod\ \phi(n).$$

Generally $\phi(n)=|\{k<n|\ \gcd(n, k)=1\}|$. i.e. $\phi(n)$ is "how many numbers which are smaller than n and have no common factors with n other than 1". As it is well known, the acronym gcd stands for greatest common divisor. Typically n=pq, where both p and q are primes; in such cases $\phi(n)=(p-1)(q-1)$.

Since for any M, $M^{\phi(n)}=1(\bmod\ n)$, with d, the inverse of $F_e^{-1}(F_e(M))=M^{ed}=M(\bmod\ n)$, but without knowing p and q, it is difficult to compute d from e such that $de=1(\bmod\ \phi(n))$.

Using the RSA encryption scheme, a user A, chooses two primes, $p_A$ and $q_A$. User A computes $n_A=p_A q_A$, where $(p_A, q_A)$ is secret trapdoor information of user A. User A chooses $e_A$ in $\{2, 3, \ldots, n-1\}$ and $(n_A, e_A)$ becomes user A's public key. User A also computes private key $d_A$ satisfying $$e_A d_A=1(\bmod\ \phi(n_A)),$$

where $$\phi(n_A)=(p_A-1)(q_A-1).$$

User B, who sends a message M to A, gets user A's public key $(n_A, e_A)$ from either a public database or directly from user A. User B computes $C=M^{e_A}(\bmod\ n_A)$ and user B sends the encrypted message C to user A. User A decrypts C by $M=C^{d_A}(\bmod\ n_A)$.

Digital Signature

Digital signature is used to authenticate data and the sender of the data. A digital signature of user A on message M is denoted $S_A(M)$ and is called the signature. As a signature, $S_A(M)$ can only be produced by user A and $S_A(M)$ can be verified by any user with knowledge of user A's public key.

In order to make a digital signature, user A has a pair of public/private keys $(pk_A, sk_A)$. The public key $pk_A$ is certified by the certificate authority. The certificate of public key binds a user's identity and public key together. Public keys are available from either a public database or the users. A private key $sk_A$ is user A's private information. User A's signature $S_A(M)$ on message M is a function of M and private key $sk_A$.

In order for user B to verify the signature $S_A(M)$, user B gets user A's public key $pk_A$. User B applies the message, the signature of the message and user A's public key to a verification function, V. The verification function returns one of two results: "yes, it is user A's signature on message M" or "no, it is not user A's signature on message M".

Consider how the RSA public key scheme can implement digital signature. User A chooses secret trapdoor information, $p_A$ and $q_A$. User A computes $n_A=p_A q_A$ and chooses $e_A$ in $\{2, 3, \ldots, n_A-1\}$. The pair $(n_A, e_A)$ is user A's public key. User A computes his/her private key, $d_A$ satisfying $e_A d_A=1(\bmod\ \phi(n_A))$.

User A's signature on message M is $S_A(M)=h(M)^{d_A}(\bmod\ n_A)$, where h is a hash function. The hash function is publicly known and is collision free: it is difficult to find M and M' such that $M\neq M'$ and $h(M)=h(M')$.

User B can verify user A's signature, $S_A(M)$, by computing $T=V(m, pk_A, S_A(M))=S_A(M)^{e_A}(\bmod\ n_A)$ and the hash of the message, h(M). If $T=h(M)$, $S_A(M)$ is verified as user A's signature on the message M. Otherwise, $S_A(M)$ is not a correct signature of user A on message M; either the message has been changed since user A signed it or user A didn't sign the message.

Consider how digital signatures can be constructed based on discrete logarithms. For example, the Digital Signature Standard, DSS, was proposed by National Institute of Standards and Technology (NIST) is 1991. DSS is based on observation that the exponentiation function in GF(p) is a one-way function, where p is a large prime and p−1 has a large prime factor q. Prime p, q, and a number g in $\{2, 3, \ldots, p-1\}$ are publicly known. For g, q is the smallest number satisfying $g^q=1(\bmod\ p)$.

User A signs a message by first randomly choosing a private key, $X_A$ in $\{2, 3, \ldots, q-2\}$. User A computes his/her public key, $Y_A=g^{X_A}(\bmod\ p)$. User A signs a message, M, by randomly choosing k in $\{1, 2, \ldots, q-1\}$ and computing $r=(g^k(\bmod\ P))(\bmod\ q)$ and $s=(h(M)+X_A r)k^{-1}(\bmod\ q)$, where h is a collision free hash function. The pair (r,s) is user A's signature of the message M, $S_A(M)=(r,s)$.

User B, verifies the signature $S_A(M)=(r,s)$, by computing two intermediate values, $e_1=h(M)s^{-1}(\bmod\ q)$ and $e_2=rs^{-1}$ (mod q). User B then computes $T=(g^{e_1}Y_A^{e_2}(\text{mod } p))$ (mod q)). The signature is verified if $T=r$. Otherwise, $S_A(M)$ is not a correct signature of user A on message M.

How A Signed Message Can Be Misinterpreted By Replacing The Public Key

In a Digital Signature Standard (DSS) signature scheme, each user, using a processor, chooses a private key X in {2, 3, ..., q−2} and calculates public key $Y=g^X(\text{mod } p)$, where p and q are primes and q is a factor of p−1 such that $g^q=1(\text{mod } p)$.

For a message M, which preferably is embodied as bits, the user can sign the message M with private key as (r, s) by choosing k at random and calculating $(r=g^k(\text{mod } p))$ (mod q), $s=(h(M)+Xr)k^{-1}(\text{mod } q)$, where h(M) is the hash of the message M. The signature is verified by checking $g^{h(M)}Y^r = r^s(\text{mod } p)$. The public key certificate serves not only to protect the signer not to be forged, but also to provide the recipient of the signature a legal commitment of the signer. There are some undeniable signature schemes which have been proposed. See D. Chaum, J. H. Evertse and J. van de Graaf, "An Improved Protocol for Demonstrating Possession of Discrete Logarithms and Some Generalizations", Advances in Cryptology—Eurocrypt '87, Proceedings, Lecture Notes in Computer Science, 304, Springer-Verlag, 1988, 127–141.

Suppose that a user, Eve, who has original public DSS key $Y_{E1}=g^e(\text{mod } p)$ is certified by certificate authority. Let $$\text{Sig}_E(M, Y_{E1})=(r, s)$$

be a signature of Eve on message M satisfying $$g^{h(M)}Y_{E1}^r = r^s(\text{mod } p),$$

where $h(M)+er=ks(\text{mod } q)$.

For a message M', Eve may interpret (r, s) to be her signature on M' by replacing Eve's public key: Eve calculates $$t=(h(M)-h(M'))/r(\text{mod } q)$$

and forms her DSS public key as $Y_{E2}=Y_{E1} g^t (\text{mod } p)$. With DSS public key $Y_{E2}$, Eve can claim that (r, s) is her signature on message M', since $$(r, s)=\text{Sig}_E(M', Y_{E2}').$$

In fact, $g^{h(M')} (Y_{E2}')^r = r^s(\text{mod } p)$, if observing $h(M')+(e+t)r=h(M)-tr)+(e+t)r=h(M)+er=ks(\text{mod } q)$.

A message signed with RSA also can be misinterpreted. Since the principle is identical to the attacks on encrypted messages in the section on How An Encrypted Message Can Be Misrepresented By Replacing Public Key, it is not repeated here.

How A Session Key Establishment Protocol Can Be Spoofed By Setting Public Key Trap Suppose that two parties, Alice and Bob, establish a common key by the following protocol. Each of them gets a Diffie-Hellman public number certified by certificate authority, which is static public number. Let $Y_A=g^{XA}(\text{mod } p)$ and $Y_B=g^{XB}(\text{mod } p)$ be Alice's and Bob's static public numbers, respectively.

In the protocol, each party produces a public number on-line and exchange them. $W_A=g^{RA}(\text{mod } p)$ from Alice and $W_B=g^{RB}(\text{mod } p)$ from Bob. $W_A$ and $W_B$ are called ephemeral public numbers. The protocol is shown in FIG. 1, where $ID_A$ and $ID_B$ denote Alice and Bob's identity numbers, respectively. As shown in FIG. 1, Alice transmits her public number $W_A$ and identity number $ID_A$ to Bob, and Bob transmits his public number $W_B$ and identity number $ID_B$ to Alice. From this exchanged information, as is well known in the art, Alice and Bob can generate a common key. The common key $K_{AB}$ is defined as $$K_{AB}=g^{XB \cdot RA+XA \cdot RB}(\text{mod } p),$$

The common key is computed with a processor by Alice with the formula $$K_{AB}=Y_B^{RA}W_B^{XA}(\text{mod } p),$$

and the common key is computed with a processor by Bob with the formula $$K_{AB}=Y_A^{RB}W_A^{XB}(\text{mod } p).$$

Figure 2:
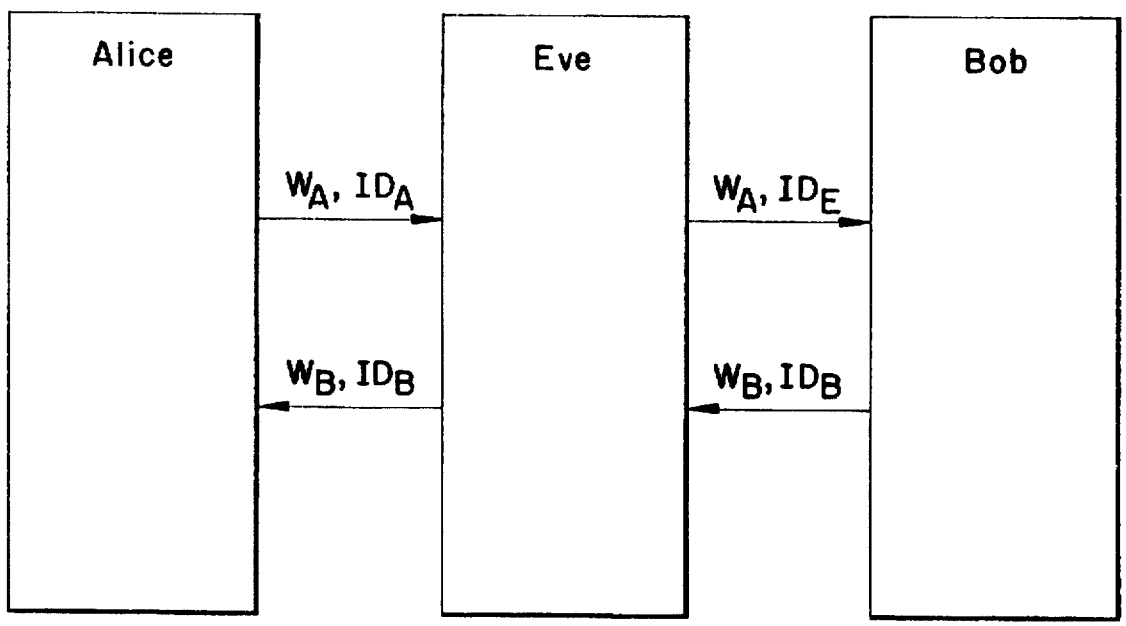
FIG. 2 illustrates how a session key establishment protocol can be spoofed by setting public key trap.

This protocol can be attacked by a "man-in-the-middle". This attack was found by Menezes, Qu and Vanstone (A. J. Menezes, M. Qu and S. Vanstone, "Some New Key Agreement Protocols Providing Implicit Authentication", presented at Selected Area of Cryptography conference, May 1995, pp. 1–13). If a malicious user, say Eve, registered a static public number as $$Y_E=Y_A^e=g^{XA \cdot e}(\text{mod } p),$$

i.e. $Y_E$ is a function of $Y_A$ then Eve is able to attack the key exchange protocol between Alice and Bob. The possible spoofing is shown in FIG. 2. Alice transmits her public number $W_A$ and identity number $ID_A$ to Bob. Eve intercepts this transmission, and replaces Alice's identification number $ID_A$ with her, Eve's, identification number $ID_E$. Bob believing he has received Eve's public number $W_E=W_A$ with Eve's identification number $ID_E$, transmits his public number $W_B$ and identification number $ID_B$ to Eve. Eve replaces Bob's public number with the number $W_B^e$. Eve transmits $W_B^e$ and Bob's identification number $ID_B$. Alice is deceived into believing $W_B^e$ is Bob's original public number.

Notice that Alice considers that she exchanges the key with Bob, and Bob's ephemeral public number is $W_B^e$. However Bob thinks that he exchanges the key with Eve, $W_E=W_A$, and forms the common key by Eve's static public number.

So Alice and Bob compute the common key as $$K_{AB}=(W_B^e)^{XA} Y_B^{RA}=g^{RB \cdot XA+XB \cdot RA}(\text{mod } p).$$

$$K_{BE}=(W_E)^{XB} Y_E^{RB}=g^{RB \cdot XA+XB \cdot RA}(\text{mod } p).$$

Eve makes a successful attack in the sense that even Alice and Bob obtain the same common key, Bob accepts Eve's identity. Furthermore, the key, actually shared by Alice and Bob, is different from the key which should be shared with their static public numbers and original ephemeral public numbers.

How An Encrypted Message Can Be Misrepresented By Replacing Public Key

In the ElGamal encryption scheme, each user, say Eve, registers a public key $Y_E=g^e(\text{mod } p)$.

The message m, which is sent to Eve, is encrypted as E(m, $Y_E$)=(R, C). The ciphertext is produced by choosing r at random and calculating $R=g^r(\text{mod } p)$, $$C=Y_A^r M=R^e M=g^{re} M(\text{mod } p).$$

Once Eve gets (R, C), she decrypts by computing $M=C/R^e$ (mod p).

If Eve chose the prime p to be a weak prime, for example, p−1 has only small prime factors, and she computed discrete logarithm module p, then Eve can also misrepresent the encrypted message. In fact, for a given ciphertext (R, C) and a message M', by the assumption, Eve can find an i such that $$R^i = C/M' \pmod{p}.$$

Once Eve replaces her public key $Y_E$ by $Y_E' = g^i \pmod{p}$, (R, C) is an encryption of M' with the public key $Y_E'$.

This attack is especially irritating, when the sender signs an encrypted message. Suppose Alice is the sender. The message M is first encrypted by Eve's public key $E(M, Y_E)$. Then Alice signs the ciphertext. So the message from Alice to Eve is $$Sig_{Alice}(E(M, Y_E))$$

Here, the signature scheme does not need to be specified. Later, Eve can register a new public key $Y_E'$ so that Alice's signature is valid over the encrypted message M' that has been encrypted by Eve's new public key, $Y_E'$:

$$Sig_{Alice}(E(M, Y_E)) = Sig_{Alice}(E(M', Y_E'))$$

Alice finds that it is hard to vindicate herself that the message she signed and sent to Eve is M and not M'.

The same attack can be perpetrated with RSA encryption scheme. Suppose that a user Eve gets her RSA encryption key (n, e) certified, where n=pq, p and q are primes. If n were an integer with 500–600 bits, then p and q should be 200–300 bits.

The message M is encrypted as $C=M^e \pmod{n}$. Since both p and q are only 200–300 bits, Eve is able to compute discrete logarithm module n. For any message M', Eve can find t such that $(M')^t = M \pmod{n}$.

Replacing the public key of Eve by (n, te), the cipher C can be misrepresented to an encryption of message M', since $C=(M')^{te} \pmod{n}$.

The attacks in this section are found by Anderson and Needham, R. Anderson and R. Needham, "Robustness Principles for Public Key Protocols", Advances in Cryptology—Crypto '95, Lecture Notes in Computer Science, Springer, 1995, pp. 236–247.

Sterilization Scheme of Discrete Logarithm Public Keys

This section provides a sterilization scheme for public key algorithms based on discrete logarithms: DSS, Diffie-Hellman, and ElGamal.

Figure 3:
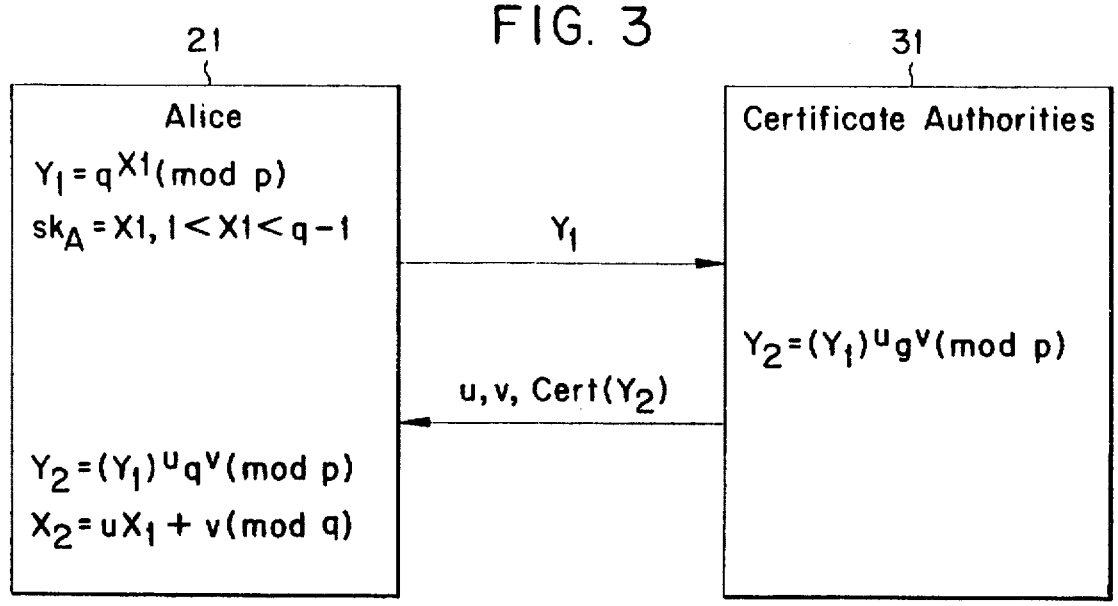
FIG. 3 illustrates a sterilization scheme for discrete logarithm public keys.

Suppose that p is a prime and g is a $q^{th}$ root of 1 in modulo p, where q is either a prime factor of p−1 or q=p−1. A user Alice and the certificate authority execute the following operations, referring to FIG. 3:

1. Alice, using a processor, i.e., Alice's processor 21, generates a first private key $X_1$ where $X_1 \in \{2, 3, \ldots, q-2\}$ at random, calculates a first public key $Y_1$ from a first function, which is easy for computing the first public key from the first private key, and difficult for computing the private key from the public key, e.g., $Y_1 = g^{X_1} \pmod{p}$, and sends the first public key $Y_1$ to certificate authority (CA). 2. Certificate authority, using a processor, i.e., the CA's processor 31, generates, at random, a first random factor u and a second random factor v, where u, v $\in \{1, 2, \ldots, q-1\}$, calculates a second public key $Y_2$ from a second function, which is easy for computing the second public key from the first public key and random factors, and difficult for computing random factors from a given second public key and first public key, e.g., $Y_2 = (Y_1)^u g^v \pmod{p}$. If the certificate authority deemed the second public key to be unacceptable, for example, the second public key matches another previously certified public keys on the public key database, then the certificate authority generates new random factors u and v and produces a new second public key from the first public key. If the certificate authority accepted the second public key, then the second public key is a sterilized version of the first public key. The certificate authority certifies the second public key and generates a certificate of the second public key, Cert$\{Y_2\}$. Then certificate authority sends random factors u, v and certificate of second public key Cert($Y_2$) to Alice.

3. Alice, using her processor 21, verifies her second public key $Y_2$ by computing $Y_2 = (Y_1)^u g^v \pmod{p}$. From then on Alice has $Y_2$ as her public key.

4. Alice using her processor 21, calculates a second private key $X_2 = uX_1 + v \pmod{q}$. From then on Alice uses her second private key to sign.

Sterilization Scheme of RSA Public Key

In RSA encryption or signature scheme, a user Alice first chooses two prime numbers p and q and computes a composite number n, with n=pq. The two prime numbers p, q, are secret trapdoor information of Alice. Then Alice selects a random number $Y_1$ as a first public number $Y_1$ where $Y_1 \in \{3, 4, \ldots, n-1\}$. The composite number and the first public number $Y_1$, (n, $Y_1$) as used herein, are a first public key of Alice.

Differently from the discrete logarithm setting, the sterilization of RSA public key employs a one-way hash function H from a set S to=$\{1, 2, \ldots, n-1\}$, for any integer n. There are at least two schemes for sterilizing an RSA public key.

Figure 4:
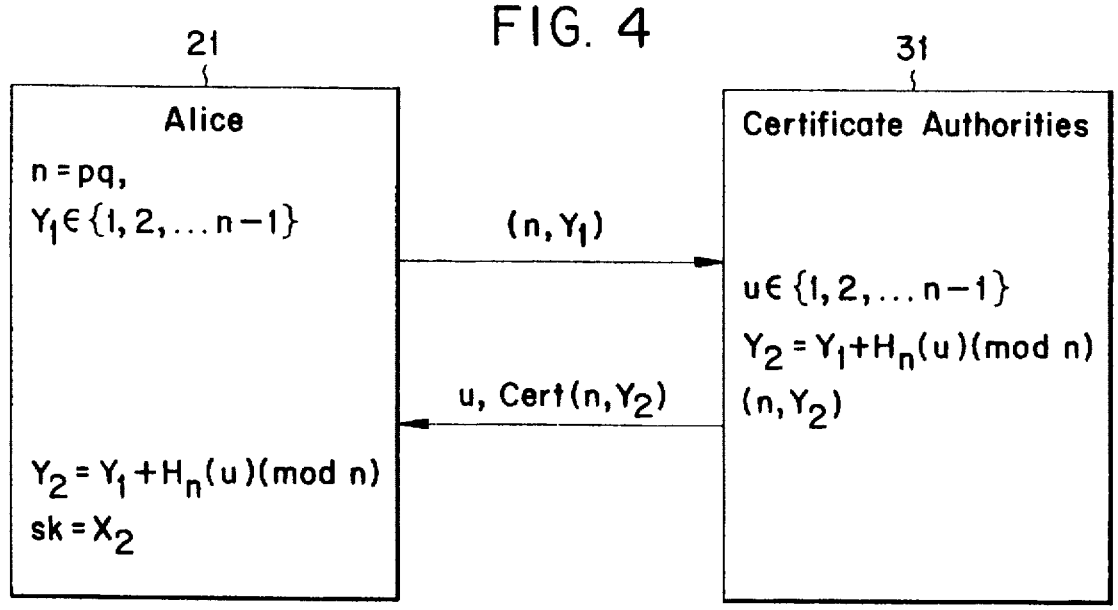
FIG. 4 illustrates a first sterilization scheme for RSA public key.

In the first scheme, in order to sterilize the RSA public key, the following operations are executed by Alice and certificate authority, referring to FIG. 4:

1. Alice, using a processor, i.e., Alice's processor 21, chooses two prime numbers p and q, computes a composite number n=pq, then selects a random number $Y_1$ as a first public number $Y_1$, where $Y_1 \in \{3, 4, \ldots, n-1\}$ and sends the composite number and the first public number (n, $Y_1$) as a first public key to certificate authority. The two prime numbers p, q, are secret trapdoor information of Alice.

2. Certificate authority, using a CA processor 31, i.e., the CA's processor, chooses, at random, a first random factor u in set S such that H(u) is in $\{1, 2, \ldots, n-1\}$, computes second public key $Y_2$ from $Y_2 = Y_1 + H(u) \pmod{n}$. If the certificate authority deemed the second public key to be unacceptable, then the certificate authority generates a new random factor u and produces a new second public key from the first public key. If the certificate authority accepted the second public key, the second public key is a sterilized version of the first public key. The certificate authority certifies the second public key and generates a certificate of the second public key Cert$\{n, Y_2\}$. Certificate authority sends the first random factor u and Cert(n, $Y_2$) to Alice.

3. Alice, using Alice's processor 21, verifies the second public key from $Y_2 = Y_1 + H(u) \pmod{n}$, and calculates a corresponding second private key sk=$X_2$ such that $Y_2 X_2 = 1 \pmod{\phi(n)}$.

Figure 5:
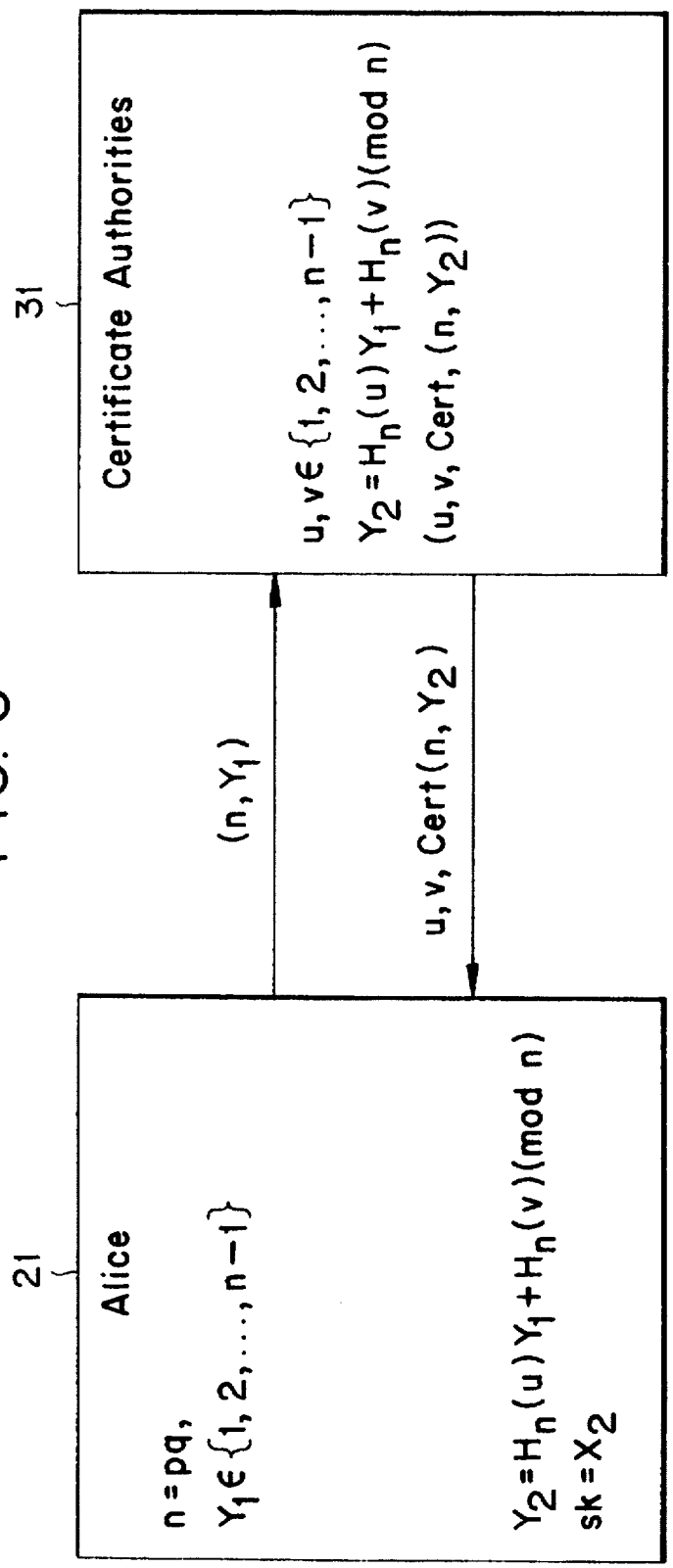
FIG. 5 illustrates a second sterilization scheme for RSA public key.

In the second scheme, in order to sterilize the RSA public key, the following operations are executed by Alice and certificate authority, referring to FIG. 5:

1. Alice, using a processor, i.e., Alice's processor 21, chooses two primes p and q, computes the composite number n=pq, then selects a random number $Y_1$ as a first public number $Y_1$, where $Y_1 \in \{3, 4, \ldots, n-1\}$ and sends the composite number and the first public number (n, $Y_1$), as a first public key, to certificate authority. The two prime numbers p, q, are secret trapdoor information of Alice.

2. Certificate authority, using a CA processor, i.e., the CA's processor 31, chooses, preferably at random, two random factors, i.e., a first random factor u, and a second random factor v, in S, computes sterilized public key $Y_2=\{H(u)Y_1+H(v)\}(\text{mod } n)$. The second public key is a sterilized version of the first public key. The certificate authority certifies the second public key and generates a certificate of the second public key Cert$\{n, Y_2\}$. Certificate authority sends the first random factor u, second random factor v and Cert(n, $Y_2$) to Alice. H(u) is a hash function of u, and H(v) is a hash function of v, and H(u) and H(v) are both in $\{1, 2, \ldots, n-1\}$.

3. Alice, using Alice's processor 21, verifies the second public key from the first random factor u, and the second random factor v, from $Y_2=\{H(u)Y_1+H(v)\}(\text{mod } n)$ and verifies with the certified second public key, and calculates a corresponding second private key sk=$X_2$ such that $Y_2X_2=1(\text{mod } \phi(n))$.

Security Consideration

The sterilization methods disclosed herein are just some examples to randomize the public keys. The basic idea is "cut-and-choose".

A user cannot predict which public key he finally gets. If a user chose a public key with malicious purposes as stated in How A Signed Message Can Be Misinterpreted By Replacing The Public Key and How An Encrypted Message Can Be Misrepresented By Replacing Public Key, then these sterilization schemes will thwart the possible attacks. If a user obtained use of some homomorphism relationship with other user's key as in the example of the section on How A Session Key Establishment Protocol Can Be Spoofed By Setting Public Key Trap, then a special sterilization function destroys the relationship.

Conversely, the certificate authority is not able to reduce the secrecy of a user's private key in the sense that the entropy of a private key is exactly the same as the entropy before the key is sterilized. Furthermore, by using one-way function of some random numbers, certificate authority cannot choose any specific public key. Thus, certificate authority is not able to control the public key obtained by the user. In discrete logarithm public key sterilization scheme proposed in the section on Sterilization Scheme of Discrete Logarithm Public Keys, for $Y \in \{1, 2, \ldots, p-1\}$ and a public key $Y_A$, certificate authority can find first integer u and second integer v such that $$Y_A^u g^v = Y(\text{mod } p)$$

then the group representative problem has an efficient solution. Similarly, in the RSA public key sterilization scheme, for $e \in \{1, 2, \ldots, n-1\}$, and public key $e_A$, certificate authority can find $u \in S$ such that $e=\{e_A+H(u)\}(\text{mod } n)$ if and only if certificate authority can compute the inverse of H. This is believed impossible since H is an one-way hash function.

However, the sterilization scheme with the same random perturbing idea is not accessory to the attackers. That is, the functional relationships among the first public key, the first private key, the second public key, and the second private key will not help or assist the malicious users. Any attacks, if they can be done after the key is sterilized, must have been possible before the key was sterilized.

It will be apparent to those skilled in the art that various modifications can be made to the public key sterilization method of the instant invention without departing from the scope or spirit of the invention, and it is intended that the present invention cover modifications and variations of the public key sterilization method provided they come within the scope of the appended claims and their equivalents.

We claim:

1. A method for sterilizing a first public key by a certificate authority (CA) with a CA processor, with "sterilizing" defined to mean a process for randomly perturbing the first public key, comprising the steps of:

a. generating, at a user with a user processor, a first private key;

b. generating, at the user using the user processor, the first public key from the first private key, using a first function easy for computing the first public key from the first private key, and computationally difficult for computing the private key from the public key, with "easy" meaning a function executable on a computer in seconds and "computationally difficult" meaning a problem for which a known most efficient solution requires such large amounts of time and memory that a solution to the problem is computationally infeasible;

c. sending, from the user to the certificate authority, the first public key;

d. generating, at the certificate authority with the CA processor, a first random factor u;

e. calculating, at the certificate authority with the CA processor, a second public key from the first public key and the first random factor, using a second function easy for computing the second public key from the first public key and first random factor and computationally difficult for computing the first random factor from the first and second public keys, with "easy" meaning a function executable on a computer in seconds and "computationally difficult" meaning a problem for which a known most efficient solution requires such large amounts of time and memory that a solution to the problem is computationally infeasible;

f. certifying, with a certificate, the second public key as a sterilized-public key, with "sterilized-public key" defined as a randomly perturbed version of the first public key;

g. sending, from the certificate authority to the user, the first random factor and the certificate of the sterilized-public key;

h. verifying, at the user using the user processor, the sterilized-public key from the first public key and the first random factor by using the second function; and i. calculating, at the user using the user processor, a second private key from the first random factor and the first private key.

2. The method for sterilizing the first public key by a certificate authority (CA) with a CA processor as set forth in claim 1, wherein:

j. the step of (d) generating includes a step of generating, at the certificate authority with the CA processor, at least the first random factor and a second random factor;

k. the step of (e) calculating includes the step of calculating, at the certificate authority with the CA processor, the sterilized-public key from the first public key, the first random factor and the second random factor, using the second function easy for computing the second public key from the first public key and first and second random factors, and difficult for computing the first and second random factors from the second public key and the first public key;

l. the step of (g) sending includes the step of sending, from the certificate authority to the user, the first and second random factors, and the certificate of the sterilized-public key;

m. the step of (h) verifying includes the step of verifying, at the user with the user processor, the sterilized public key from the first and second random factors and the first public key by the second function easy for computing the second public key from the first public key and the first and second random factors, and difficult for computing the first and second random factors from the second public key and the first public key; and n. the step of (i) calculating includes the step of calculating, at the user with the user processor, a second private key from the first and second random factors and the first private key.

3. A method for sterilizing a first public key by a certificate authority (CA) with a CA processor, with "sterilizing" defined to mean a process for randomly perturbing the first public key, comprising the steps of:

a. generating, at a user with a user processor, a first public key;

b. sending, from the user to the certificate authority, the first public key;

c. generating, at the certificate authority with the CA processor, a first random factor u;

d. calculating, at the certificate authority with the CA processor, a second public key from the first public key and the first random factor, using a second function easy for computing the second public key from the first public key and the first random factor and computationally difficult for computing the first random factor from the first public key and the second public key, with "easy" meaning a function executable on a computer in seconds and "computationally difficult" meaning a problem for which a known most efficient solution requires such large amounts of time and memory that a solution to the problem is computationally infeasible;

e. certifying, with a certificate, the second public key as a sterilized public key with "sterilized public key" defined as a randomly perturbed version of the first public key;

f. sending, from the certificate authority to the user, the first random factor and the certificate of the sterilized public key;

g. verifying, at the user using the user processor, the sterilized public key from the first random factor and the first public key; and h. calculating, at the user using the user processor, a second private key from the sterilized public key and some user private information.

4. The method for sterilizing the first public key by a certificate authority (CA) with a CA processor as set forth in claim 3, wherein:

i. the step of (c) generating includes a step of generating, at the certificate authority with the CA processor, at least the first random factor and a second random factor;

j. the step of (d) calculating includes the step of calculating, at the certificate authority with the CA processor, the second public key from the first public key, the first random factor and the second random factor, using the second function easy for computing the second public key from the first public key and the first and second random factors, and difficult for computing the first and second random factors from the second public key and the first public key;

k. the step of (f) sending includes the step of sending, from the certificate authority to the user, the first and second random factors and a certificate of the sterilized-public key;

l. the step of (g) verifying includes the step of verifying, at the user with the user processor, the sterilized public key from the first and second random factors and the first public key by the second function easy for computing the second public key from the first public key and the first and second random factors, and difficult for computing the first and second random factors from the second public key and the first public key; and m. the step of (h) calculating includes the step of calculating, at the user with the user processor, a second private key from the sterilized public key and some user private information.

5. A method, using a prime number p and a number g, where g is a $q^{th}$ root of 1 modulo p, where q is a prime factor of p−1 or q=p−1, for sterilizing a first public key $Y_1$ by a certificate authority (CA) using a CA processor, with "sterilizing" defined to mean a process for randomly perturbing the first public key, comprising the steps of:

generating, at a user with a user processor, a first private key $X_1$, where $X_1$ belongs to a set $\{2, 3, \ldots, q-2\}$;

generating, at the user with the user processor, a first public key $Y_1$ from $Y_1 = g^{X_1}(\mod p)$;

sending, from the user to the certificate authority, the first public key $Y_1$;

generating, at the certificate authority with the CA processor, a first integer u and a second integer v, where u, v ∈ $\{1, 2, \ldots, q-1\}$;

calculating, at the certificate authority with the CA processor, a second public key $Y_2$ from $$Y_2 = (Y_1)^u \, g^v (\mod p);$$

certifying the second public key with a certificate Cert$\{Y_2\}$;

sending, from the certificate authority to the user, the first integer, the second integer and the certificate of second public key Cert$\{Y_2\}$;

verifying, at the user with the user processor, the second public key $$Y_2 = (Y_1)^u \, g^v (\mod p); \text{ and}$$

calculating, at the user with the user processor, a second private key $$X_2 = \{uX_1 + v\}(\mod q).$$

6. A method, using the product n of a first prime number p and a second prime number q, n=pq, for sterilizing a first public key by a certificate authority (CA) using a CA processor, with "sterilizing" defined to mean a process for randomly perturbing the first public key, comprising the steps of:

a. computing, at the user with a user processor, a composite number n, from n=pq, with the first prime number p and the second prime number q computationally difficult to determine from the composite number n, with "computationally difficult" meaning a problem for which a known most efficient solution requires such large amounts of time and memory that a solution to the problem is computationally infeasible;

b. selecting at random, a first public number $Y_1$ where the first public number $Y_1$, belongs to a set $\{3, 4, \ldots, n-1\}$;

c. sending, from the user to the certificate authority, the composite number n and the first public number;

d. generating, at the certificate authority with the CA processor, a first random factor u, such that a hash function of u, H(u) is in $\{1, 2, \ldots, n-1\}$;

e. calculating, at the certificate authority with the CA processor, a second public number from $$Y_2 = Y_1 + H(u) \pmod{n};$$

where H(u) is the hash function of u;

f. certifying a second public key with a certificate Cert$\{(n, Y_2)\}$, where the second public key includes the composite number n and the second public number $Y_2$;

g. sending, from the certificate authority to the user, the first random factor, and a certificate of the second public key;

h. verifying, at the user with the user processor, the second public key; and i. calculating, at the user with the user processor, a second private key, $X_2$, from the second public key, where $$X_2 \cdot Y_2 = 1 \pmod{\phi(n)}.$$

7. The method as set forth in claim 6, wherein:

j. the step of (d) generating includes the step of generating, at the certificate authority with the CA processor, the first random factor u and a second random factor v, such that a hash function of u, H(u), and a hash function of v, H(v), are both in $\{1, 2, \ldots, n-1\}$;

k. the step of (e) calculating includes the step of calculating, at the certificate authority with the CA processor, the second public number $Y_2$ from $$Y_2 = H(v) + Y_1 H(u) \pmod{n};$$

where H(v) is the hash function of v and H(u) is the hash function of u; and l. the step of (g) sending includes the step of sending, from the certificate authority to the user, the first random factor, the second random factor and a certificate of the second public key of the composite number n and the sterilized public number $Y_2$ Cert$\{(n, Y_2)\}$.

8. A system for sterilizing a first public key by a certificate authority (CA), with "sterilizing" defined to mean a process for randomly perturbing the first public key, comprising:

a user processor, located at a user, for generating a first private key, and for generating a first public key from the first private key using a first function easy for computing the first public key from the first private key, and difficult for computing the first private key from the first public key, said user processor sending, from the user to the certificate authority, the first public key;

a CA processor, located at the certificate authority, for generating a first random factor u, and for calculating a second public key from the first public key and the first random factor using a second function easy for computing the second public key from the first public key and the first random factor, and difficult for computing the first random factor from the second public key and the first public key, with "easy" meaning a function executable on a computer in seconds and "computationally difficult" meaning a problem for which a known most efficient solution requires such large amounts of time and memory that a solution to the problem is computationally infeasible, said CA processor sending, from the certificate authority to the user, the first random factor and a certificate of the second public key; and said user processor for verifying the second public key from the first random factor and the first public key, and for calculating a second private key from the first random factor and the first private key.

9. A system for sterilizing a first public key by a certificate authority (CA), with "sterilizing" defined to mean a process for randomly perturbing the first public key, comprising:

a user processor, located at a user, for generating the first public key, and for sending, from the user to the certificate authority, the first public key;

a CA processor, located at the certificate authority, for generating a first random factor u, and for calculating a second public key from the first public key and the first random factor using a second function easy for computing the second public key from the first public key and the first random factor, and difficult for computing the first random factor from the second public key and the first public key, with "easy" meaning a function executable on a computer in seconds and "computationally difficult" meaning a problem for which a known most efficient solution requires such large amounts of time and memory that a solution to the problem is computationally infeasible, said CA processor sending, from the certificate authority to the user, the first random factor and a certificate of the second public key; and said user processor for calculating a second private key from the second public key and some user private information.

10. A system for sterilizing a first public key by a certificate authority (CA), with "sterilizing" defined to mean a process for randomly perturbing the first public key, comprising:

a user processor, located at a user, for generating a first private key, and for generating a first public key from the first private key using a first function easy for computing the first public key from the first private key, and difficult for computing the first private key from the first public key, with "easy" meaning a function executable on a computer in seconds and "computationally difficult" meaning a problem for which a known most efficient solution requires such large amounts of time and memory that a solution to the problem is computationally infeasible, said user processor sending, from the user to the certificate authority, the first public key;

a CA processor, located at the certificate authority, for generating at least a first random factor and a second random factor, and for calculating a second public key from the first public key and the first and second random factors, using a second function easy for computing the second public key from the first public key and the first and second random factors, and difficult for computing the first and second random factors from the second public key and the first public key, with "easy" meaning a function executable on a computer in seconds and "computationally difficult" meaning a problem for which a known most efficient solution requires such large amounts of time and memory that a solution to the problem is computationally infeasible, said CA processor sending, from the certificate authority to the user, the first and second random factors and a certificate of the second public key; and said user processor for calculating the second public key from the first random factor, the second random factor and the first public key, and for calculating, at the user with the user processor, a second private key from the first and second random factors and the first private key.

11. A system for sterilizing a first public key by a certificate authority (CA), with "sterilizing" defined to mean a process for randomly perturbing the first public key, comprising:

a user processor, located at a user, for generating a first public key, and for sending, from the user to the certificate authority, the first public key;

a CA processor, located at the certificate authority, for generating at least a first random factor and a second random factor, and for calculating a sterilized-public key from the first public key and the first and second random factors using a one-way function, and for sending, from the certificate authority to the user, the first random factor, the second random factor and a certificate of the sterilized-public key; and said user processor for calculating the sterilized-public key from the first and second random factors and the first public key, and for calculating a second private key from the sterilized-public key and some user private information.

12. A system, using a prime number p and a $q^{th}$ root g in modulo p, where q is a prime factor of p−1 or q=p−1, for sterilizing a first public key $Y_1$ by a certificate authority (CA), with "sterilizing" defined to mean a process for randomly perturbing the first public key, comprising:

a user processor, located at a user, for generating a first private key $X_1$, for generating a first public key $Y_1$ from $Y_1=g^{X_1}(\text{mod } p)$, and for sending, from the user to the certificate authority, the first public key $Y_1$;

a CA processor, located at the certificate authority, for generating a first random integer u and a second random integer v, where u, v ∈ {1, 2, . . . , q−1}, for calculating a sterilized-public key $Y_2$ from $Y_2=(Y_1)^u g^v(\text{mod } p)$, and for sending, from the certificate authority to the user, the first random integer u, the second random integer v and a certificate of the sterilized-public key Cert{$Y_2$}; and said user processor for calculating the sterilized-public key $Y_2=(Y_1)^u g^v(\text{mod } p)$, and for calculating a second private key $X_2=\{uX_1+v\}(\text{mod } q)$.

13. A system, using a first prime number p and a second prime number q for sterilizing a first public key $Y_1$ by a certificate authority (CA), with "sterilizing" defined to mean a process for randomly perturbing the first public key, comprising:

a user processor, located at the user, for computing a composite number n, from n=pq, for selecting at random, the first public number $Y_1$ where $Y_1$ ∈ {2, 3, . . . , n−1}, and for sending, from the user to the certificate authority, the composite number and the first public number $Y_1$;

a CA processor, located at the certificate authority, for generating a first random factor u, where H(u) ∈ {1, 2, . . . , n−1}, for calculating a second public number $Y_2$ from $Y_2=Y_1+H(u)$ (mod n), where H(u) is a hash function of u, for certifying the second public key Cert{n, $Y_2$}, and for sending, from the certificate authority to the user, the first random factor, and a certificate of the second public key; and said user processor for calculating the second public number $Y_2$, and for calculating a second private key, $X_2$, from the second public key, where $X_2 \cdot Y_2 = 1(\text{mod } \phi(n))$.

14. A system, using a first prime number p and a second prime number q for sterilizing a first public number $Y_1$ by a certificate authority (CA), where a user, with a user processor, computes a composite number n, from n=pq, and selects at random a first public key (n, $Y_1$) where $Y_1$ ∈ {1, 2, . . . , n−1}, with "sterilizing" defined to mean a process for randomly perturbing the first public key, comprising:

means for sending, from the user to the certificate authority, the first public key (n, $Y_1$);

a CA processor, located at the certificate authority, for generating a first random factor u and a second random factor v, where H(u), H(v) ∈ {1, 2, . . . , n−1}, and for calculating, at the certificate authority with the CA processor, a second public number $Y_2$ from $Y_2=H(v)+Y_1H(u)$ (mod n), where H(v) is a hash function of v and H(u) is a hash function of u, for certifying a second public key (n, $Y_2$), and for sending, from the certificate authority to the user, the first random factor, the second random factor and a certificate of the second public key Cert{n, $Y_2$}; and said user processor for verifying the second public key (n, $Y_2$), and for calculating a second private key, $X_2$, from the second public key, where $X_2 \cdot Y_2 = 1(\text{mod } \phi(n))$.

\* \* \* \* \*